United States Patent [19]

Schucker

[11] 4,395,198
[45] Jul. 26, 1983

[54] CONTINUOUS TWIN-STAY COLUMNS FOR BULB HYDRAULIC TURBINES

[75] Inventor: Thomas R. Schucker, York, Pa.

[73] Assignee: Allis-Chalmers Corporation, Milwaukee, Wis.

[21] Appl. No.: 327,926

[22] Filed: Dec. 7, 1981

[51] Int. Cl.³ ............................................. F04D 29/40
[52] U.S. Cl. ................................. 415/219 R; 248/637; 290/52
[58] Field of Search ................... 415/219 R, 142, 118, 415/201; 248/637; 290/52

[56] References Cited

U.S. PATENT DOCUMENTS

| 3,393,324 | 7/1968 | Hauser et al. | 290/52 |
| 3,535,540 | 10/1970 | Boulogne | 415/219 R X |
| 4,102,599 | 7/1978 | Ziegler | 415/219 R |

FOREIGN PATENT DOCUMENTS 1275923 12/1960 France ............................ 415/219 R Primary Examiner—Harvey C. Hornsby
Assistant Examiner—Shewen Bian
Attorney, Agent, or Firm—Timothy R. Conrad

[57] ABSTRACT

A support structure for a hydraulic turbine is disclosed where the turbine has a generally horizontal drive shaft enclosed within a bulb housing. The housing is contained within a hydraulic passage formed by duct walls within the structures foundation. A structural inner stay cone is provided in the bulb housing perpendicular to the axis of the drive shaft. An outer stay cone is provided in the duct wall coplanar with the inner stay cone. A pair of vertical stay columns extend from the bottom of the outer vane to the top of the outer stay cone while passing through and affixed to the inner stay cone. The stay columns are perpendicular to the drive shaft with the shaft extending between the two stay columns. Vertical piers abutting the stay columns extend from the duct wall to the housing both above and beneath the housing.

4 Claims, 3 Drawing Figures

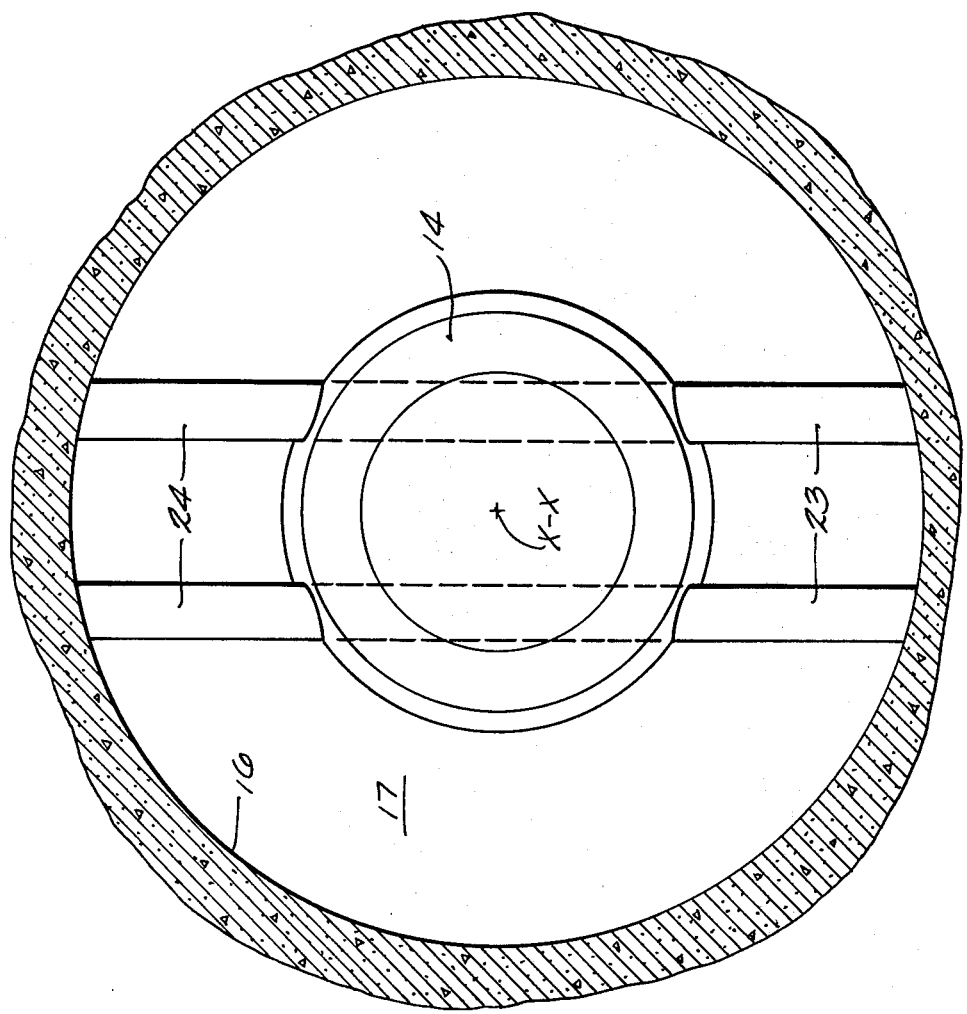

CONTINUOUS TWIN-STAY COLUMNS FOR BULB HYDRAULIC TURBINES

BACKGROUND OF THE INVENTION

1. Field of the Invention

This invention relates to hydraulic turbines having a stationary bulb housing enclosing a generator unit and generally horizontal drive shaft. Particularly, this invention is directed to support structures for maintaining stationary positioning of the bulb housing in the hydraulic passageway.

2. Description of the Prior Art

In the prior art, hydraulic turbines having a stationary bulb housing submerged in flowing water are well known for the production of hydroelectric power. Such turbines commonly have a generally horizontal drive shaft affixed to a rotary runner equipped with turbine blades. The shaft terminates in a generator unit with the shaft and generator enclosed in the bulb housing. The hydraulic passageway surrounding the bulb housing is defined by a duct wall, commonly fabricated from plate steel or the like, lining a concrete foundation surrounding the bulb housing. Access passages are commonly provided through the foundation and hydraulic passage into the bulb housing to permit maintenance and inspection of the generator unit.

In the operation of the turbine, numerous forces act to displace the bulb housing. Specifically, the weight of the turbine, the buoyancy of the turbine, axial forces of flowing water, and the torque of the turbine all contribute to displace the turbine from a desired stationary and generally horizontal position. To secure the turbine, various support structures have been used. Examples of such prior art support structures are found in U.S. Pat. Nos. 3,393,324 to H. Hauser dated July 16, 1968; 4,151,970 to Bernhard dated May 1, 1979 and 4,191,504 to Haslinger dated Mar. 4, 1980.

One method known in the prior art of supporting a bulb turbine is to equip the turbine with a vertical support structure normal to the turbine drive shaft. In such a method, the bulb housing is equipped with a structural ring, or inner stay cone, axially displaced along the drive shaft between the generator and turbine runner. A second structural ring, or outer stay cone, of larger diameter is embedded within the duct wall and concrete foundation and is coplanar with the inner stay cone.

A singular vertical support member, or stay column, connects the inner and outer stay cones. The stay column is positioned along a line perpendicular to and intersecting the drive shaft. However, while the stay column connects the inner and outer stay cones, it cannot extend through the inner stay cone due to the axially positioned rotating drive shaft.

In addition to the stay column, the prior art method of support includes a support platform, or bottom pier, abutting the stay column away from the runner. The bottom pier is integral to the foundation and extends vertically into communication with the bottom of the bulb housing. An upper pier extends from the duct wall above the bulb housing down to the housing. The upper pier is commonly hollow thereby permitting ingress and egress to the interior of the bulb.

It is known to be desirable to construct the piers and stay columns of a dimension, as small as possible, to reduce the amount of volume in the hydraulic passageway occupied by the piers and stay columns. Additionally, the stay columns and abutting piers are so constructed so in horizontal cross section they form a teardrop shape tapered toward the runner thereby minimizing resistance to the hydraulic flow about the bulb toward the turbine blades.

While the above-described prior art support structure has been satisfactory in the past, the current demand for hydroelectric power has precipitated the demand for larger bulb turbines. As the size of the bulb turbine increases, the aforementioned forces acting to displace the desired stationary positioning of the bulb increase. Additionally, larger turbines require larger hydraulic passages resulting in an increased area of unsupported foundation in overlying relation to the bulb turbine.

The result of the increased forces, together with the weight of the overlying foundation transmitted to the bulb through the pier and stay column above the bulb, is an intolerable compressing and twisting force upon the inner stay cone in the bulb housing. These forces tend to deform the inner stay cone and urge the turbine out of its desired stationary position.

It has been suggested to accommodate the increased force by simply increasing the dimensions of the stay column and piers. However, this suggestion is unsatisfactory for at least two reasons. The increased dimensions would reduce the volume of water that could pass to the turbine blades thereby reducing turbine efficiency. Additionally, the larger dimension would not diminish, but indeed would increase, the compression forces acting on the inner stay cone.

Applicant has determined the larger forces attendent with larger bulb turbines can be accommodated without an increase in the dimensions of the piers and stay column by dividing the piers and column in half and placing the support structure on both sides of the drive shaft. This configuration permits passing twin-stay columns through the inner stay cone. By affixing the inner stay cone to the stay columns at the location of intersection, the inner stay cone acts as a structural cross member joining the twin-stay columns thereby eliminating the above-described compression of the inner stay cone. Additionally, this design retains the desired minimum dimensions of the support structure and the hydraulic teardrop shape of the support structure thereby permitting the relatively uninhibited flow of water about the bulb housing to the turbine blades.

The object of the present invention is to provide a structural support for a hydraulic turbine which relieves compression forces acting upon the turbine bulb housing.

It is a further object of the present invention to provide a structural support for a hydraulic turbine which requires a minimum of interference with the volume of water passing the bulb housing and which permits a hydraulic shape thereby minimizing flow impedence about the support structure.

SUMMARY OF THE INVENTION

According to a preferred embodiment of the present invention, there is provided a support structure for a hydraulic turbine. The hydraulic turbine comprises a rotary runner hub with an axially extending drive shaft terminating in a generator unit. The shaft and generator unit are enclosed within a stationary bulb housing. The housing is positioned within a hydraulic passageway defined by a duct wall affixed to the turbine foundation.

A structural inner stay cone is provided in the bulb housing perpendicular to the drive shaft between the generator unit and the runner. An outer stay cone is embedded in the duct wall with the outer stay cone coplanar to the inner stay cone.

A pair of vertical stay columns are provided extending from the outer stay cone beneath the bulb housing to the outer stay cone above the bulb housing. The stay columns pass through the inner stay cone above and beneath the housing and are affixed to the inner stay cone at the location of intersection. The stay columns are positioned perpendicular to the drive shaft with the shaft extending between the two columns.

Support piers abut each of the columns on the edges thereof away from the runner. The support piers extend from the bulb housing to the duct wall above and beneath the bulb housing. A pier, together with its adjacent portion of the stay column, has a cross section of a half teardrop with the combination of piers and stay columns being symmetrical about a plane extending vertically through the drive shaft.

DESCRIPTION OF THE PREFERRED EMBODIMENT

Figure 1:
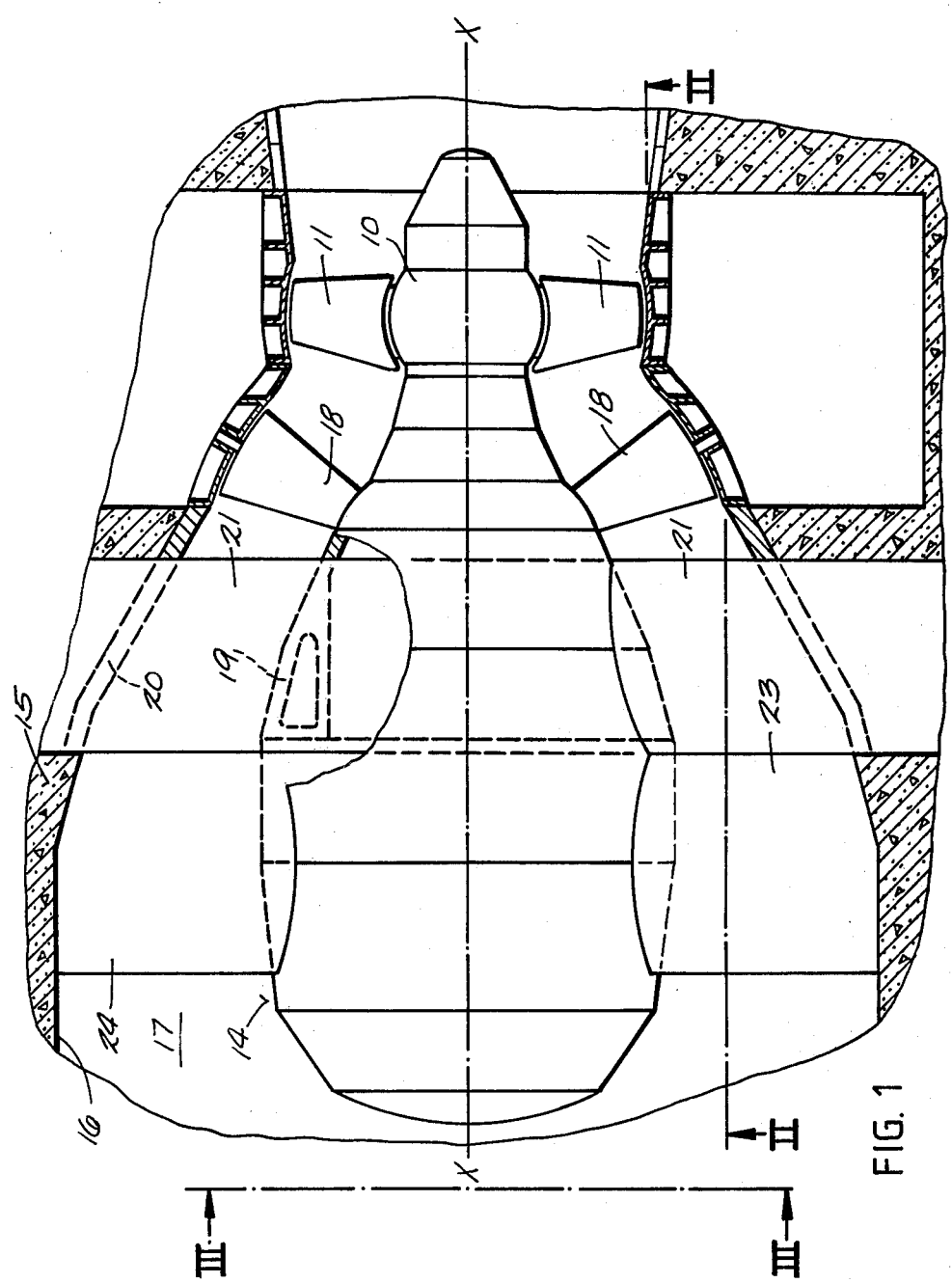
FIG. 1 is a lateral view of a hydraulic turbine showing the mounting structure with a cutaway view showing a vertical stay column extending through an inner stay cone.
Figure 2:
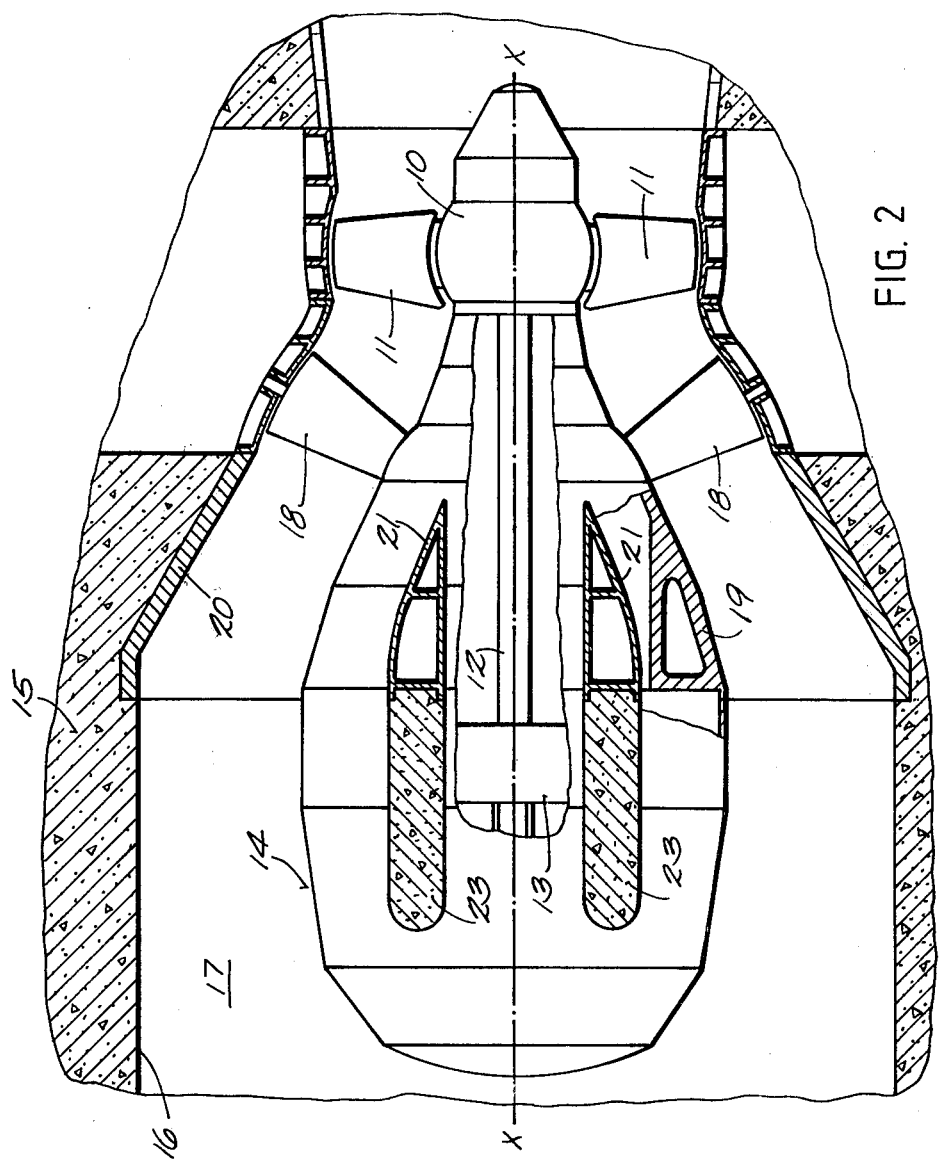
FIG. 2 is a bottom view of a hydraulic turbine taken along line II—II of FIG. 1 with a cutaway view showing the drive shaft and generator unit of the turbine with a cutaway view showing an inner stay cone; and, FIG. 3 is a view of a hydraulic turbine taken along line III—III of FIG. 1.

Referring to FIG. 1, a hydraulic turbine is shown including a rotary runner 10 having a generally horizontal axis of rotation X—X with a plurality of adjustable turbine blades 11. The runner 10 is affixed to a rotary drive shaft 12 extending axially therefrom and terminating in a generator unit 13 remote from runner 10 (FIG. 2). A stationary bulb housing 14 is provided adjacent said runner 10 and enclosing the drive shaft 12 and generator unit 13.

A foundation 15 having an inner surface, or duct wall 16, surrounds the bulb housing 14 with the duct wall 16 facing the housing 14. Duct wall 16 cooperates with bulb housing 14 to define a hydraulic passage 17 for the passage of water around the bulb housing 14 to blades 11 upon runner 10. A plurality of wicket gates 18 are provided extending radially from bulb housing 14 to duct wall 16 for the control of water toward blades 11.

Bulb housing 14 is provided with an inner stay cone 19 having a frustum configuration. Inner stay cone 19 is disposed along axis X—X between generator unit 13 and runner 10 with inner stay cone 19 being perpendicular to shaft 12. Inner stay cone 19 is fabricated from structural steel or other suitable material.

An outer stay cone 20 is provided embedded in duct wall 16 within foundation 15. Outer stay cone 20 is of a frustum configuration surrounding inner stay cone 19 and coplanar therewith. Outer stay cone 20 is fabricated from structural steel plate or other suitable material.

A pair of vertical stay columns 21 are provided extending through bulb housing 14 coplanar with inner stay cone 19. Stay columns 21 are disposed perpendicular to shaft 12 with shaft 12 extending between stay columns 21 and equidistant therefrom. Stay columns 21 are affixed to said outer stay cone 20 beneath bulb housing 14 and extend vertically to stay cone 20 above said housing 14 and are affixed thereto. Stay columns 21 are affixed to inner stay cone 19 at the locations of intersection between inner stay cone 19 and stay columns 21 at the upper and lower surfaces of bulb 14. Stay columns 21 are fabricated from structural plate steel or other suitable material and may be hollow to permit access to the interior of bulb housing 14 or filled with support material, such as concrete. As shown in FIG. 1, stay columns 21 may extend through outer stay ring 20 and terminate within foundation 15.

A pair of bottom vertical piers 23 formed from concrete or suitable support material extend from the bottom of bulb housing 14 downwardly to foundation 15. Said bottom piers 23 abut said stay columns 21 on the vertical ends thereof remote from said runner 10. Each stay column 21, together with the abutting bottom vertical pier 23, cooperates to define a pair of vertical planes parallel to one another and equidistant from axis X—X.

A pair of top vertical piers 24 fabricated from plate steel or other suitable material extend from the top of bulb housing 14 upwardly to foundation 15. Said top vertical piers 24 are hollow to permit ingress and egress to the interior of bulb 14. Said top piers 24 abut said stay columns 21 on the vertical ends thereof remote from said runner 10. Said top vertical piers 24 are coplanar with the planes defined by the bottom vertical piers 23 and stay columns 21.

As shown in FIG. 2, a cross section of a column 21 together with an abutting pier 24, 23 is a half of a hydraulic teardrop shape with the two combinations of columns 21 and piers 24, 23 being symmetrical about a plane running vertically through axis X—X.

From the foregoing detailed description of the present invention, it has been shown how the objects of the present invention have been attained in a preferred manner. However, modification and equivalents of the disclosed concepts, such as readily occur to those skilled in the art, are intended to be included in the scope of this invention. Thus, the scope of the invention is intended to be limited only by the scope of the claims such as are or may hereafter be, appended hereto.

The embodiments of the invention in which an exclusive property or privilege is claimed are defined as follows:

1. A support structure for a hydraulic turbine having a rotatably mounted runner having a generally horizontal axis of rotation with a rotatable drive shaft affixed to one end of said runner and extending axially therefrom; said shaft terminating in a generator unit remote from said runner; a stationary bulb housing adjacent said runner and enclosing said drive shaft and generator unit; a duct wall surrounding said runner and bulb housing and cooperating with said runner and bulb housing to define a hydraulic passage; said bulb housing including an inner stay cone axially disposed along said drive shaft between said generator unit and said runner; said inner stay cone being perpendicular to said shaft; an outer stay cone embedded in said duct wall and coplanar with said inner stay cone; the improvements comprising:

a pair of vertical stay columns extending through said bulb housing with said drive shaft extending between said stay columns; each of said columns being affixed to said outer stay cone beneath said bulb housing and extending vertically through said inner stay cone in said bulb housing and being affixed to said outer stay cone above said bulb housing; said vertical stay columns being affixed to said inner stay cone where said columns pass through said inner stay cone; and, a pair of bottom vertical piers adjacent said stay columns remote from said runner; said bottom vertical piers being integral with said duct wall beneath said bulb housing and extending vertically upward into communication with said bulb housing.

2. A support structure for a hydraulic turbine having a rotatably mounted runner having a generally horizontal axis of rotation with a rotatable drive shaft affixed to one end of said runner and extending axially therefrom; said shaft terminating in a generator unit remote from said runner; a stationary bulb housing adjacent said runner and enclosing said drive shaft and generator unit; a duct wall surrounding said runner and bulb housing and cooperating with said runner and bulb housing to define a hydraulic passage; said bulb housing including an inner stay cone axially disposed along said drive shaft between said generator unit and said runner; said inner stay cone being perpendicular to said shaft; an outer stay cone embedded in said duct wall and coplanar with said inner stay cone; the improvements comprising:

a. a pair of vertical stay columns extending through said bulb housing with said drive shaft extending between said stay column; each of said columns affixed to said outer stay cone beneath said bulb housing and extending vertically through said inner stay cone in said bulb housing and being affixed to said outer stay cone above said bulb housing; said vertical stay column affixed to said inner stay cone where said columns pass through said inner stay cone;

b. a pair of bottom vertical piers adjacent said stay columns remote from said runner; said bottom vertical piers being integral with said duct wall beneath said bulb housing and extending vertically upward into communication with said bulb housing; and, c. a pair of top vertical piers adjacent said stay columns remote from said runner; said top vertical piers being integral with said duct wall above said bulb housing and extending vertically downward into communication with said bulb housing.

3. A support structure for a hydraulic turbine having a rotatably mounted runner having a generally horizontal axis of rotation with a rotatable drive shaft affixed to one end of said runner and extending axially therefrom; said shaft terminating in a generator unit remote from said runner; a stationary bulb housing adjacent said runner and enclosing said drive shaft and generator unit; a duct wall surrounding said runner and bulb housing and cooperating with said runner and bulb housing to define a hydraulic passage; said bulb housing including an inner stay cone axially disposed along said drive shaft between said generator unit and said runner; said inner stay cone being perpendicular to said shaft; an outer stay cone embedded in said duct wall and coplanar with said inner stay cone; the improvements comprising:

a pair of vertical stay columns extending through said outer stay cone with each of said columns adjacent to said inner stay cone and with said drive shaft extending between said stay columns; said columns being affixed to said inner stay cone where said columns are adjacent to said inner stay cone; and, a pair of bottom vertical piers adjacent said stay columns remote from said runner; said bottom vertical piers being integral with said duct wall beneath said bulb housing and extending vertically upward into communication with said bulb housing.

4. A support structure for a hydraulic turbine having a rotatably mounted runner having a generally horizontal axis of rotation with a rotatable drive shaft affixed to one end of said runner and extending axially therefrom; said shaft terminating in a generator unit remote from said runner; a staionary bulb housing adjacent said runner and enclosing said drive shaft and generator unit; a duct wall surrounding said runner and bulb housing and cooperating with said runner and bulb housing to define a hydraulic passage; said bulb housing including an inner stay cone axially disposed along said drive shaft between said generator unit and said runner; said inner stay cone being perpendicular to said shaft; an outer stay cone embedded in said duct wall and coplanar with said inner stay cone; the improvements comprising:

a. a pair of vertical stay columns extending through said outer stay cone with each of said columns adjacent to said inner stay cone and with said drive shaft extending between said stay columns; said columns being affixed to said inner stay cone where said columns are adjacent to said inner stay cone.

b. a pair of bottom vertical piers adjacent said stay columns remote from said runner; said bottom vertical piers being integral with said duct wall beneath said bulb housing and extending vertically upward into communication with said bulb housing; and, c. a pair of top vertical piers adjacent said stay columns remote from said runner; said top vertical piers being integral with said duct wall above said bulb housing and extending vertically downward into communication with said bulb housing.

* * * * *